United States Patent
Bain et al.

(10) Patent No.: US 10,065,318 B2
(45) Date of Patent: Sep. 4, 2018

(54) METHODS AND SYSTEMS OF REPAIRING A STRUCTURE

(71) Applicant: The Boeing Company, Huntington Beach, CA (US)

(72) Inventors: David Michael Bain, Ashburton (AU); Phillip John Crothers, Hamptone East (AU); Martin Szarski, Canterbury (AU)

(73) Assignee: The Boeing Company, Chicago, IL (US)

( * ) Notice: Subject to any disclaimer, the term of this patent is extended or adjusted under 35 U.S.C. 154(b) by 540 days.

(21) Appl. No.: 14/598,379

(22) Filed: Jan. 16, 2015

(65) Prior Publication Data

US 2016/0075028 A1   Mar. 17, 2016

Related U.S. Application Data

(63) Continuation-in-part of application No. 14/485,909, filed on Sep. 15, 2014.

(51) Int. Cl.
*B25J 9/00* (2006.01)
*B25J 9/16* (2006.01)

(52) U.S. Cl.
CPC ... *B25J 9/1684* (2013.01); *G05B 2219/37449* (2013.01); *G05B 2219/49378* (2013.01); *Y10S 901/41* (2013.01); *Y10S 901/47* (2013.01)

(58) Field of Classification Search
None
See application file for complete search history.

(56) References Cited

U.S. PATENT DOCUMENTS

| | | | |
|---|---|---|---|
| 6,101,425 A * | 8/2000 | Govindaraj | G06F 9/543 700/104 |
| 6,950,548 B1 | 9/2005 | Bachelder et al. | |
| 7,983,790 B2 | 7/2011 | Crothers et al. | |
| 2002/0128790 A1 | 9/2002 | Woodmansee | |
| 2004/0186613 A1* | 9/2004 | Balling | G05B 19/4185 700/169 |
| 2010/0023157 A1 | 1/2010 | Burgess et al. | |
| 2010/0161100 A1 | 6/2010 | Crothers et al. | |
| 2010/0235037 A1 | 9/2010 | Vian et al. | |
| 2010/0314029 A1* | 12/2010 | Lindgren | B23Q 17/20 156/98 |
| 2011/0087352 A1* | 4/2011 | Krause | B23P 6/002 700/98 |

(Continued)

FOREIGN PATENT DOCUMENTS

| EP | 0369891 A2 | 5/1990 |
|---|---|---|
| EP | 2204710 A1 | 7/2010 |

OTHER PUBLICATIONS

EPO Extended Search Report for related application 15201161.5 dated Jun. 2, 2016; 7 pp.

(Continued)

*Primary Examiner* — Paul Yanchus, III
(74) *Attorney, Agent, or Firm* — Armstrong Teasdale LLP

(57) ABSTRACT

A method of repairing a structure is provided. The method includes inspecting the structure with a robotic device to identify a structural defect in the structure, generating a tool path for repairing the structural defect, and transmitting the tool path to the robotic device from a location remote from the robotic device.

14 Claims, 10 Drawing Sheets

(56) References Cited

U.S. PATENT DOCUMENTS

2014/0259589 A1* 9/2014 Xu .................. F01D 5/005
 29/402.01
2015/0336331 A1* 11/2015 Potter ............... G01N 23/046
 264/40.1

OTHER PUBLICATIONS

EP Examination Report for related application EP15201161.5 dated Jan. 5, 2018; 4 pp.

* cited by examiner

METHODS AND SYSTEMS OF REPAIRING A STRUCTURE

CROSS REFERENCE TO RELATED APPLICATIONS

This application is a continuation-in-part and claims priority to U.S. patent application Ser. No. 14/485,909 filed Sep. 15, 2014 for "METHODS AND SYSTEMS FOR AUTOMATICALLY INSPECTING AN OBJECT", which is hereby incorporated by reference in its entirety.

BACKGROUND

The field of the disclosure relates generally to inspection systems, and, more particularly, to methods and systems for automatically inspecting an object.

Objects are often inspected to facilitate maintaining a desired level of quality and/or consistency. Many inspections are performed manually by a trained operator holding an inspection probe. For example, the trained operator may manually position the inspection probe in a plurality of inspection positions with respect to an object being inspected. Manual inspections, however, may be tedious and/or time consuming. To at least partially address these issues, some known inspection devices include a robot that operates based on a nominal path from computer-aided design (CAD) data. However, at least some known objects do not have relevant CAD data and/or are not consistent with the available CAD data. Accordingly, inspection of such objects generally requires iterative and manual adjustment of the inspection device to maintain a desired inspection path, which may be tedious and/or time consuming, particularly for complex surfaces that require a plurality of inspection positions.

The field of the present disclosure also relates generally to repairing damaged structures and, more specifically, to automated systems and methods of repairing damaged structures.

Recently, at least some known aircraft components have been fabricated from multi-layer laminate structures of non-metallic composite materials such as carbon-fiber-reinforced polymer (CFRP). The composite materials are used in combination with metallic materials, such as aluminum, titanium, and/or steel, to reduce the weight of the aircraft. Reducing the overall weight generally contributes to increasing the fuel efficiency of the aircraft.

However, common multi-layer laminate structures fabricated from CFRP may be susceptible to damage, such as from blunt force impacts during service or manufacturing. At least one known process of repairing damaged laminate structures is a flush bonded structural repair process that facilitates reducing the visibility of the structural repair. The process includes removing the damaged area from the structure forming a recess in the structure, and tapering the recess (i.e., scarfing) to provide improved load transfer in a repair patch used to fill the recess. Scarfing is a time-consuming and laborious process that is generally performed by trained technicians by hand. As such, structural repair processes that require scarfing are dependent on the skill and availability of the trained technicians. Moreover, the effectiveness of the repair patch must be verified via inspection techniques, which can be costly and laborious as well.

BRIEF SUMMARY

In one aspect, a method is provided for automatically inspecting an object. The method includes automatically moving, using a robotic device for moving an inspection tool, a scanner to collect data associated with a surface of the object, determining a surface profile associated with the surface of the object based on the data, and generating a tool path for inspecting the object using the inspection tool based on the surface profile.

In another aspect, a system is provided for automatically inspecting an object. The system includes a robotic device for moving an inspection tool, a scanner coupleable to the robotic device such that the robotic device is configured to automatically move the scanner to collect data associated with a surface of the object, and a computer system configured to determine a surface profile associated with the surface of the object based on the data, and generate a tool path for inspecting the object using the inspection tool based on the surface profile.

In yet another aspect, one or more computer-readable storage media having computer-executable instructions embodied thereon is provided. When executed by at least one processor, the computer-executable instructions cause the processor to automatically move, using a robotic device for moving an inspection tool, a scanner to collect data associated with a surface of the object, determine a surface profile associated with the surface of the object based on the data, and generate a tool path for inspecting the object using the inspection tool based on the surface profile.

In another aspect, a method of repairing a structure is provided. The method includes inspecting the structure with a robotic device to identify a structural defect in the structure, generating a tool path for repairing the structural defect, and transmitting the tool path to the robotic device from a location remote from the robotic device.

In another aspect, a system for use in repairing a structure is provided. The system includes a robotic device including at least one inspection tool, wherein the robotic device is at a first location. The system also includes a computing device coupled in communication with the robotic device, wherein the computing device is at a second location remote from the first location. The computing device is configured to direct the robotic device to inspect the structure with the at least one inspection tool to identify a structural defect in the structure, generate a tool path for repairing the structural defect, and transmit the tool path to said robotic device.

In yet another aspect, a computer-readable storage media having computer-executable instructions embodied thereon, wherein, when executed by at least one processor, the computer-executable instructions cause the processor to direct a robotic device to inspect a structure with at least one inspection tool to identify a structural defect in the structure, generate a tool path for repairing the structural defect, and transmit the tool path to the robotic device from a location remote from the robotic device.

The features, functions, and advantages described herein may be achieved independently in various embodiments of the present disclosure or may be combined in yet other embodiments, further details of which may be seen with reference to the following description and drawings.

Figure 1:
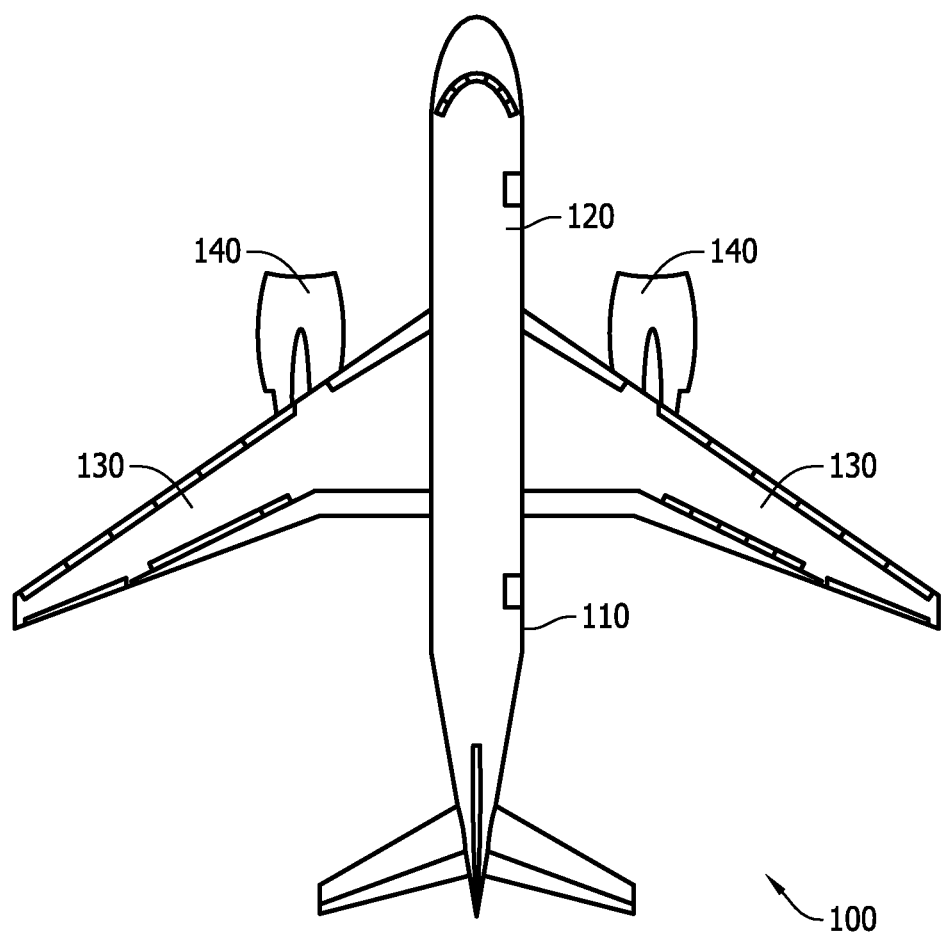
FIG. 1 is a plan view of an example aircraft.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

The subject matter described herein relates generally to inspection systems and, more particularly, to methods and systems for automatically inspecting an object. In one embodiment, a system includes a robotic device, a scanner coupleable to the robotic device, and a computer system. The robotic device automatically moves the scanner to collect data associated with a surface of the object, and the computer system determines a surface profile associated with the surface of the object based on the data, and generates a tool path for inspecting the object based on the surface profile. The embodiments described herein enable objects to be inspected automatically and systematically, thereby reducing a number of touches by a user operator.

The methods and systems described herein may be implemented using computer programming or engineering techniques including computer software, firmware, hardware, or any combination or subset thereof, wherein the technical effects may be achieved by performing at least one of the following steps: (a) automatically couple the scanner to the robotic device; (b) automatically move a scanner to collect data associated with a surface of the object; (c) determine a surface profile associated with the surface of the object based on the data; (d) generate a three-dimensional map of the surface within a predetermined coordinate system associated with the robotic device; (e) generate a tool path for inspecting the object based on the surface profile; (f) automatically decouple the scanner from the robotic device; (g) automatically couple an inspection tool to the robotic device; and (h) automatically move an inspection tool along the tool path to perform a non-destructive inspection of the object.

The following detailed description illustrates embodiments of the disclosure by way of example and not by way of limitation. It is contemplated that the disclosure has application to inspection methods and systems, in general, to facilitate increasing accuracy and/or precision associated with inspections, decreasing inspection time, and/or increasing throughput and/or productivity.

An element or step recited in the singular and preceded with the word "a" or "an" should be understood as not excluding plural elements or steps unless such exclusion is explicitly recited. Moreover, references to "one embodiment" of the present invention and/or the example embodiment are not intended to be interpreted as excluding the existence of additional embodiments that also incorporate the recited features.

FIG. 1 is a plan view of an example aircraft 1000. In the example embodiment, aircraft 1000 includes a body 110 including a fuselage 120 and a pair of wings 130 extending from fuselage 120. In the example embodiment, at least one engine 140 is coupled to each wing 130 to provide thrust to aircraft 1000. Aircraft 1000, and its component parts, includes a plurality of objects that are each inspectable using an inspection system, as described herein.

Figure 2:
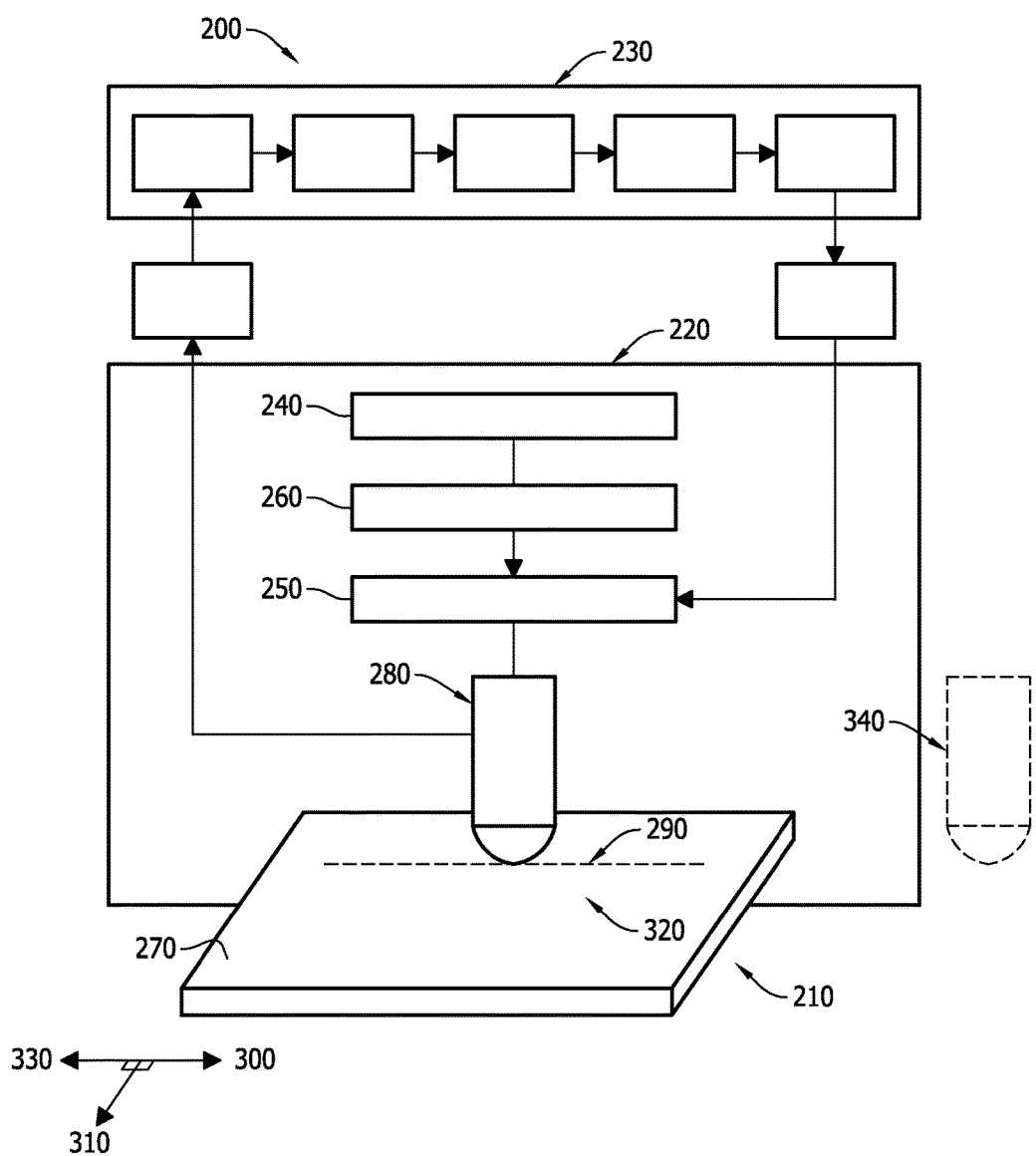
FIG. 2 is a schematic illustration of an example inspection system that may be used in inspect an object.

FIG. 2 is a schematic illustration of an example inspection system 200 that may be used in inspect an object 210, for example, an object from aircraft 1000. In the example embodiment, inspection system 200 includes a robotic device 220, and a controller (e.g., computer device and/or system) 230 configured to control an operation of inspection system 200. In the example embodiment, robotic device 220 is a free-standing structure positioned adjacent to object 210 to be inspected. Alternatively, robotic device 220 may be coupled and/or mounted directly to object 210 via a coupling mechanism, such as a suction cup and/or strap.

In the example embodiment, robotic device 220 includes a robot body 240 and a robot arm 250 extending from and/or supported by robot body 240. In the example embodiment, robot arm 250 is moveable along multiple axes within a predetermined coordinate system associated with robotic device 220 via a robot driver 260 controlled by controller 230. Accordingly, in the example embodiment, motion instructions may be used to bend, twist, spiral, and/or turn robotic body 240 and/or robotic arm 250 within a three-dimensional space such that robotic body 240 and/or robotic arm 250 are desirably positioned, moved, and/or orientated with respect to object 210.

A plurality of tools are coupleable to robotic device 220, such that controller 230 is configured to position, move, and/or orient the tool coupled to robotic device 220 with respect to object 210 and control an operation of the coupled tool and/or robotic device 220. In the example embodiment, robot arm 250 includes a plurality of jointed segments and is controlled via robot driver 260 to selectively position, move, and/or orient the tool coupled to robotic device 220 with multiple degrees of freedom adjacent to and/or over a surface 270 of object 210. Particularly, robotic device 220 is configured to maintain the coupled tool within approximately 6 inches (in.) of surface 270 of object 210. More particularly, the coupled tool is maintained between approximately 4.0 in. and approximately 5.0 in. of surface 270 of object 210. Alternatively, the coupled tool may be positioned, moved, and/or oriented in any manner that enables inspection system 200 to function as described herein.

In the example embodiment, a scanner 280 is removeably coupleable to robotic device 220 such that, when scanner 280 is coupled to robotic device 220, robotic device 220 is configured to automatically move scanner 280. Scanner 280 may be, without limitation, a laser line scanner, an optical sensor, a camera, an infrared sensor, an ultrasonic sensor, an eddy current sensor, a vibration sensor, a magnetometer, a temperature probe, a microphone, a speaker, a capacitance-based gap measurement meter, an electrical multimeter, a voltage meter, a resistance meter, a current meter, a conductivity meter, a static charge meter, and/or any combination of the aforementioned components. In one embodiment, scanner 280 includes and/or is coupled to at least one accelerometer that measures linear acceleration and/or a gyroscope that measures rotational velocity.

In the example embodiment, scanner 280 is automatically moved in a plurality of passes to collect data associated surface 270. Each pass is associated with a respective portion of surface 270. For example, in one implementation, scanner 280 is moved along a first portion 290 of surface 270 in a first direction 300, is shifted (i.e., moved) in a second direction 310 substantially perpendicular to first direction 300, and is moved along a second portion 320 of surface 270 substantially parallel to first portion 290 in a third direction 330 substantially opposite first direction 300. In such an implementation, scanner 280 is shifted in second direction 310 and the process is repeated. Alternatively, scanner 280 may be moved in any direction using any pattern that enables inspection system 200 to function as described herein.

In the example embodiment, scanner 280 is configured to detect at least one parameter of surface 270 of object 210 and/or collect data associated with surface 270 of object 210. For example, in one embodiment, scanner 280 is configured to transmit a laser towards surface 270 of object 210 and/or detect a laser reflected from surface 270 of object 210. Particularly, the laser is transmitted and/or reflected within approximately 30° of normal relative to surface 270 of object 210 (i.e., between approximately 60° and approximately 120° relative to surface 270 of object 210). More particularly, the laser is transmitted and/or reflected substantially normal relative to surface 270 of object 210. Alternatively, the laser may be transmitted and/or reflected in any orientation that enables inspection system 200 to function as described herein.

In the example embodiment, the data is associated with a plurality of positions, such that a surface profile associated with surface 270 of object 210 may be determined based on the data. The data enables surface 270 and/or object 210 to be reverse engineered. For example, in one embodiment, a three-dimensional map of surface 270 and/or a point cloud associated with surface 270 may be generated within the predetermined coordinate system associated with robotic device 220 based on the data. The three-dimensional map and/or point cloud is used, for example, to generate and/or modify computer-aided design (CAD) data, generate and/or modify a numerically-controlled (NC) path, and/or generate and/or modify a tool path for inspecting object 210 based on the surface profile.

In one embodiment, a plurality of points adjacent to object 210 that define the tool path are generated and/or modified within the predetermined coordinate system associated with robotic device 220, such that scanner 280 and a tool operating in accordance with the tool path is associated with a common coordinate system. For example, the surface profile enables surface normal to be calculated for a plurality of coordinates along surface 270 of object 210. In the example embodiment, robotic device 220 is maintained in alignment with object 210, either by not being moved relative to object 210 or, if moved, by being realigned with object 210. Accordingly, in the example embodiment, the measurements made by scanner 280 may be used to precisely design the tool path.

In the example embodiment, an inspection tool 340 is removeably coupleable to robotic device 220 such that, when inspection tool 340 is coupled to robotic device 220, robotic device 220 is configured to automatically move inspection tool 340 along the tool path. In the example embodiment, inspection tool 340 moves from a first point of the plurality of points adjacent to object 210 that define the tool path towards a second point of the plurality of points adjacent to object 210 that define the tool path.

Inspection tool 340 may be, without limitation, an optical sensor, a camera, an infrared sensor, an ultrasonic sensor, an eddy current sensor, a vibration sensor, a magnetometer, a laser scanner, a temperature probe, a microphone, a speaker, a capacitance-based gap measurement meter, an electrical multimeter, a voltage meter, a resistance meter, a current meter, a conductivity meter, a static charge meter, and/or any combination of the aforementioned components. In one embodiment, inspection tool 340 includes and/or is coupled to at least one accelerometer that measures linear acceleration and/or a gyroscope that measures rotational velocity. In at least one embodiment, scanner 280 and inspection tool 340 are the same component.

In the example embodiment, inspection tool 340 is configured to perform a non-destructive inspection of object 210. In the example embodiment, inspection tool 340 is configured to detect at least one parameter of surface 270 of object 210 and/or collect data associated with surface 270 of object 210. In one embodiment, inspection tool 340 is coupled to the same robotic device 220 that scanner 280 was and/or is coupled to, such that inspection tool 340 and scanner 280 are operated within a common coordinate system.

Figure 3:
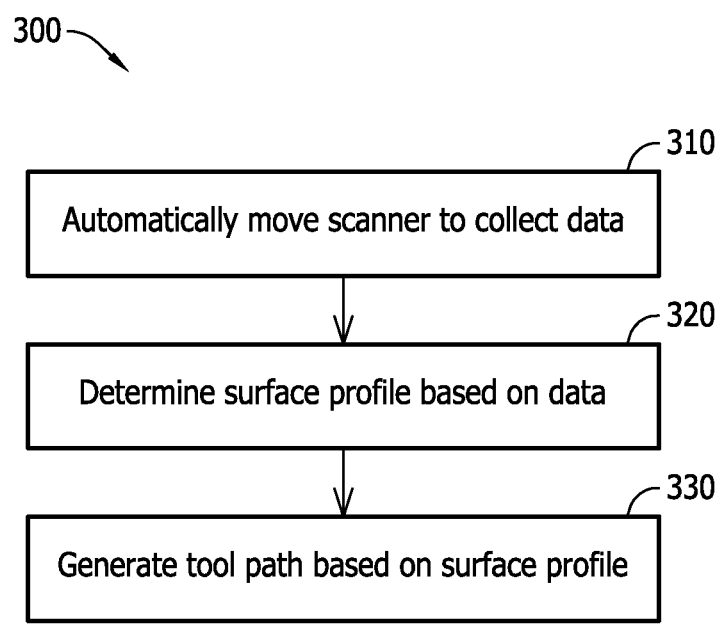
FIG. 3 is a flow chart illustrating an example method for automatically inspecting an object using the example inspection system shown in FIG. 2.

FIG. 3 is a flow chart illustrating an example method 400 for automatically inspecting an object using inspection system 200. In the example embodiment, scanner 280 is coupled to robotic device 220 and, during operation, scanner 280 is moved 410 to collect data associated with surface 270 of object 210. In one embodiment, object 210 is stabilized by mounting object 210 to facilitate reducing flexure movement and/or vibration of object 210 and/or robotic device 220 is stabilized in position with respect to object 210 to facilitate reducing relative movement between robotic device 220 and object 210.

In one embodiment, scanner 280 is moved 410 within the predetermined coordinate system associated with robotic device 220 in a plurality of passes. Each pass of the plurality of passes is associated with a respective portion of surface 270 of object 210. As scanner 280 is moved over and/or adjacent to surface 270 of object 210, position data associated with surface 270 is detected and/or recorded. In one embodiment, the position data is detected and/or recorded at predetermined intervals.

In the example embodiment, a surface profile associated with surface 270 of object 210 is determined 420 based on the data. For example, in one embodiment, a three-dimensional map and/or point cloud of surface 270 of object 210 is generated within the predetermined coordinate system associated with robotic device 220 based on the position data.

In the example embodiment, a tool path for inspecting surface 270 of object 210 is generated 430 based on the surface profile. For example, in one embodiment, the tool path is generated 430 within the predetermined coordinate system associated with robotic device 220. In one embodiment, the tool path is a numerically-created path based on a plurality of points that define the tool path.

In one embodiment, scanner 280 is decoupled from robotic device 220, and inspection tool 340 is coupled to robotic device 220. In the example embodiment, inspection tool 340 is automatically moved along the tool path to perform a non-destructive inspection of object 210. In one embodiment, robotic device 220 is actuated to desirably position, orient, and/or move inspection tool 340 relative to object 210 for inspection and/or evaluation. Position data detected by scanner 280 may be used to enable partial and/or full automation of the inspection process.

Figure 4:
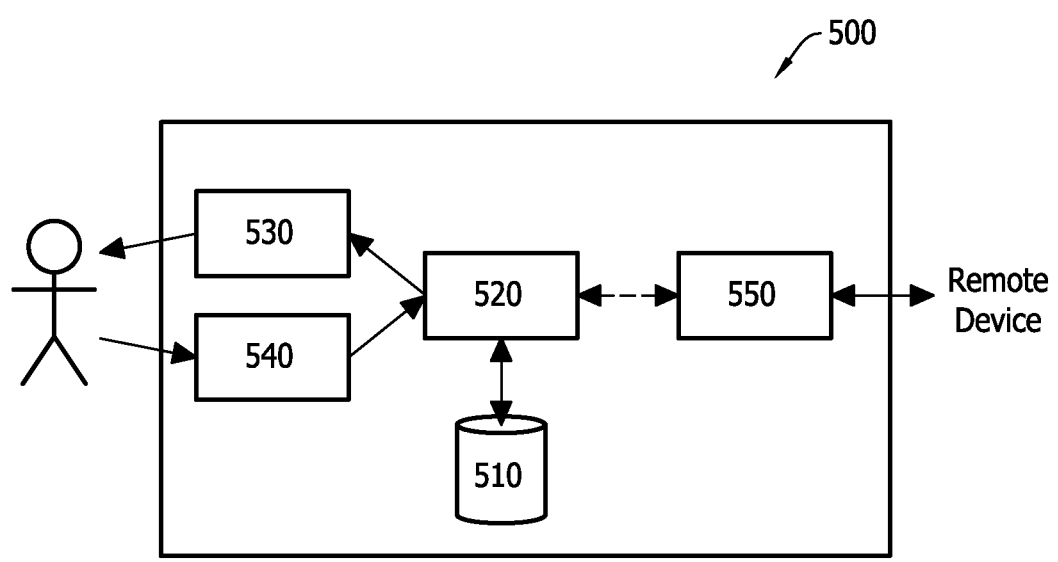
FIG. 4 is a schematic illustration of an example computer device that may be used with the inspection system shown in FIG. 2 for implementing the method shown in FIG. 3.

FIG. 4 is a schematic illustration of an example computer system 500, such as controller 230, that may be used with inspection system 200. In the example embodiment, computer system 500 includes a memory device 510 and a processor 520 coupled to memory device 510 for use in executing instructions. More specifically, in the example embodiment, computer system 500 is configurable to perform one or more operations described herein by programming memory device 510 and/or processor 520. For example, processor 520 may be programmed by encoding an operation as one or more executable instructions and by providing the executable instructions in memory device 510.

Processor 520 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the example embodiment, memory device 510 includes one or more devices (not shown) that enable information such as executable instructions and/or other data to be selectively stored and retrieved. In the example embodiment, such data may include, but is not limited to, motion instructions, CAD files, NC paths, translated NC paths, mapping data, modeling data, operational data, and/or control algorithms. In the example embodiment, computer system 500 is configured to automatically inspect object 210 using inspection system 200. Alternatively, computer system 500 may use any algorithm and/or method that enable the methods and systems to function as described herein. Memory device 510 may also include one or more computer readable media, such as, without limitation, dynamic random access memory (DRAM), static random access memory (SRAM), a solid state disk, and/or a hard disk.

In the example embodiment, computer system 500 includes a presentation interface 530 that is coupled to processor 520 for use in presenting information to a user. For example, presentation interface 530 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 530 includes one or more display devices.

Computer system 500, in the example embodiment, includes an input interface 540 for receiving input from the user. For example, in the example embodiment, input interface 540 receives information suitable for use with the methods described herein. Input interface 540 is coupled to processor 520 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 530 and as input interface 540.

In the example embodiment, computer system 500 includes a communication interface 550 that is coupled to processor 520. In the example embodiment, communication interface 550 communicates with at least one remote device, for example robotic device 220. For example, communication interface 550 may use, without limitation, a wired network adapter, a wireless network adapter, and/or a mobile telecommunications adapter. A network (not shown) used to couple computer system 500 to the remote device may include, without limitation, the Internet, a local area network (LAN), a wide area network (WAN), a wireless LAN (WLAN), a mesh network, and/or a virtual private network (VPN) or other suitable communication means.

The embodiments described herein relate generally to non-destructive inspection systems and, more particularly, to methods and systems for automatically inspecting an object. In one embodiment, a system includes a robotic device, a scanner coupleable to the robotic device such that the robotic device is configured to automatically move the scanner to collect data associated with a surface of the object, and a computer system configured to determine a surface profile associated with the surface of the object based on the data, and generate a tool path for inspecting the object based on the surface profile. The embodiments described herein enable objects to be inspected automatically and systematically, thereby reducing a number of touches by a user operator. Accordingly, the embodiments described herein facilitate increasing accuracy and/or precision associated with inspections, decreasing inspection time, and/or increasing throughput and/or productivity.

Example embodiments of methods and systems for automatically inspecting an object are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

In another aspect of the present disclosure, various implementations described herein relate to systems and methods of repairing a structure. More specifically, one or more systems and methods described herein enable the structure to be repaired by operators located remotely from the structure. In one implementation, a robotic device is coupled to the structure at a first location, and the operator interfaces with a computing device at a second location remote from the first location. The computing device is coupled in communication with the robotic device such that feedback can be provided to the operator from the robotic device, and such that the operator can leverage his/her knowledge, skills, and training to facilitate generating work instructions for the robotic device to repair the structure in an effective manner, without being physically present at the first location. More specifically, the computing device uses inputs provided by the operator to generate the work instructions, such as one or more tool paths for execution by the robotic device. As such, the work instructions are transmitted to the robotic device such that the robotic device can repair the structure in a semi-autonomous manner.

Figure 5:
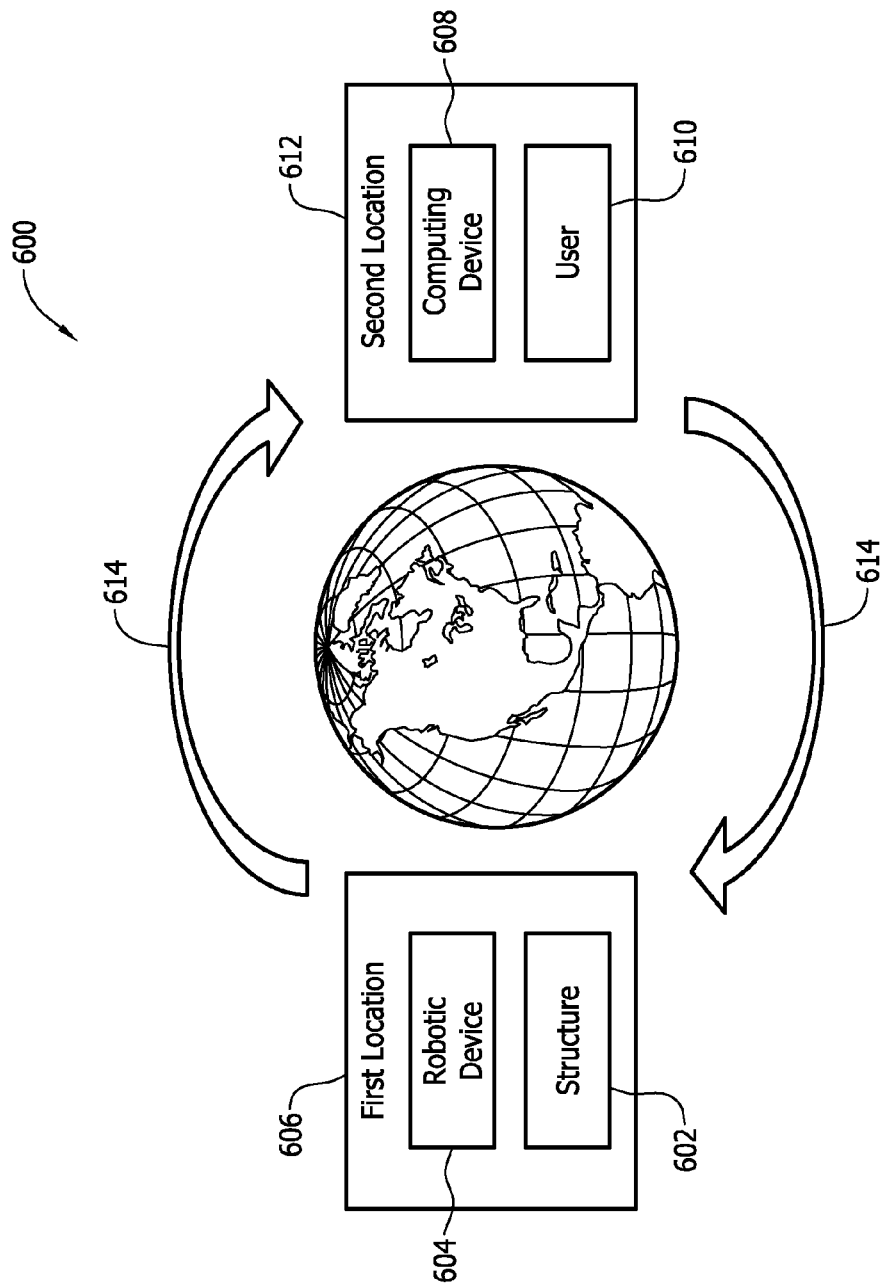
FIG. 5 is a schematic illustration of an exemplary system for use in repairing a structure.

FIG. 5 is a schematic illustration of an exemplary system 600 for use in repairing a structure 602, such as aircraft 100. In the exemplary implementation, system 600 includes a robotic device 604 (similar to robotic device 210) and structure 602 at a first location 606, and a computing device 608 and a user 610 at a second location 612 remote from first location 606. Computing device 608 is coupled in communication with robotic device 604 via a bidirectional communication link 614 such that robotic device 604 can provide feedback to computing device 608, and such that computing device 608 can provide work instructions to robotic device 604, for example. Bidirectional communication link 614 may be any transmission medium that enables system 600 to function as described herein. In an alternative implementation, first and second locations 606 and 612 may be similar in geographical scope, but with robotic device 604 located in an area either inaccessible or unsafe for human activity.

User 610 generally has unique abilities including knowledge, skills, or training that enable user 610 to facilitate repair of structure 602. For example, the abilities of user 610 enable him to perform duties such as evaluating a potentially damaged structure, identifying a potential structural defect on structure 602, and designing a repair procedure for structure 602. However, in the past, user 610 generally must be at the same location as structure 602, which may be a mobile object, to properly perform his duties. As such, bidirectional communication link 614 enables the abilities of user 610 to be leveraged to facilitate repair of structure 602 from second location 612, which is remote from first location 606. Moreover, in an alternative implementation, multiple users can leverage their collective unique abilities to facilitate repairing structure 602 from either a centralized hub or from multiple remote locations including multiple computing devices each coupled in communication with robotic device 604.

Figure 6:
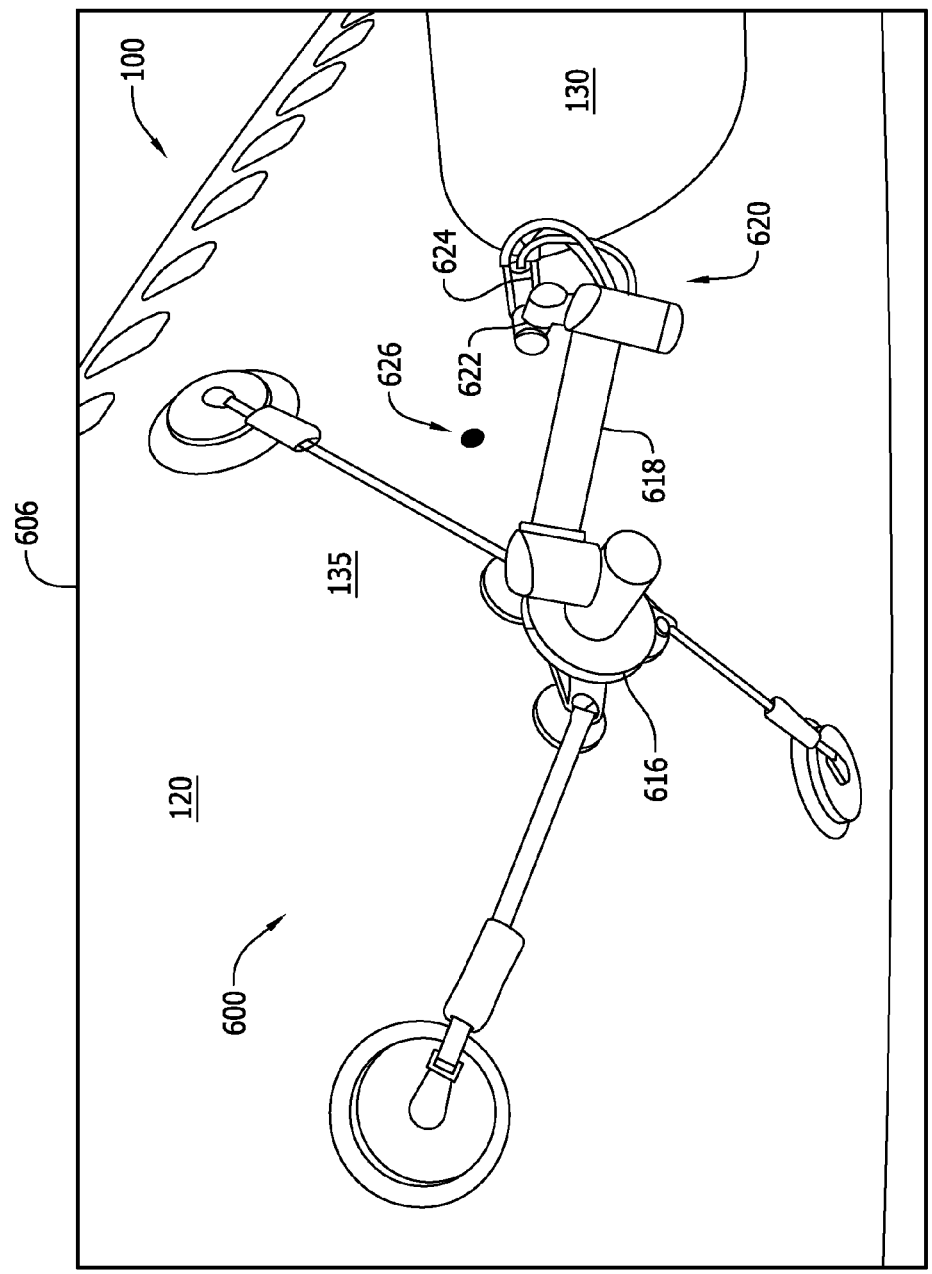
FIG. 6 is a schematic illustration of a portion of the system shown in FIG. 5 at a first location.

FIG. 6 is a schematic illustration of a portion of system 600 (shown in FIG. 5) at first location 606. In the exemplary implementation, robotic device 604 is coupled to fuselage 120 of aircraft 100. Although robotic device 604 is illustrated as coupled to fuselage 120 of aircraft 100, it should be understood that robotic device 604 may be coupled to any suitable location on aircraft 100, or to another suitable structure other than aircraft 100.

Robotic device 604 includes a base assembly 616 coupled to a surface 135 of fuselage 120, and an end effector assembly 618 coupled to base assembly 616. End effector assembly 618 is moveable along multiple axes within a predetermined coordinate system to facilitate repairing structure 602. Moreover, end effector assembly 618 includes at least one tool 620 that facilitates one or more repair operations, such as inspection or machining operations, dent measuring, or drilling. Alternatively, tool 620 facilitates manufacture or maintenance operations. For example, in one implementation, an inspection tool 622 and a cutting tool 624 are coupled to end effector assembly 618 to facilitate repairing structure 602. Exemplary inspection tools 622 include, but are not limited to, surface inspection tools such as a laser line scanner, an optical sensor, a camera, or an infrared sensor, and non-destructive inspection tools such as an ultrasonic sensor, an eddy current sensor, or an X-ray scanner. Moreover, any cutting tool 624 may be used that enables damaged material to be removed from structure 602.

Inspection tool 622 is used to facilitate at least one of locating, identifying, and evaluating a structural defect 626 in a structure 602, such as surface 135 of fuselage 120. For example, in one implementation, fuselage 120 is at least partially fabricated from multiple plies of composite material. While having a high strength-to-weight ratio, composite materials are generally brittle and susceptible to damage when impacted by foreign objects, for example. As such, as will be explained in more detail below, repairing structural defect 626 generally includes inspecting structure 602 with inspection tool 622 to identify structural defect 626, providing data from the inspection to computing device 608 over bidirectional communication link 614 (each shown in FIG. 5), generating a tool path for repairing structural defect 626, transmitting the tool path to robotic device 604, and removing structural defect 626 from structure 602 via cutting tool 624.

Figure 7:
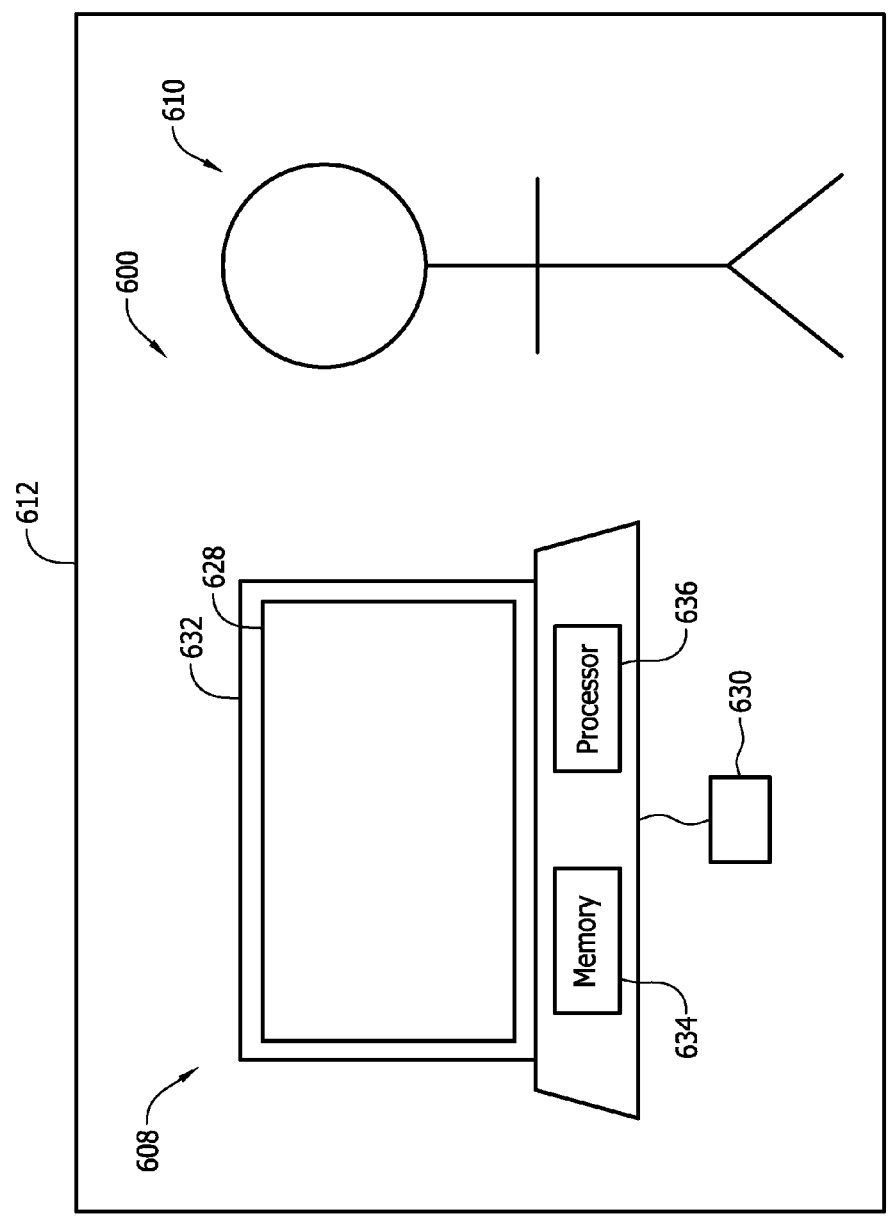
FIG. 7 is a schematic illustration of a portion of the system shown in FIG. 5 at a second location.

FIG. 7 is a schematic illustration of a portion of system 600 (shown in FIG. 5) at second location 612. System 600 includes computing device 608 and user 610 that interfaces with computing device 608 via one or more presentation devices 628, and one or more input devices 630. For example, in one implementation, computing device 608 includes a housing 632 and presentation device 628 disposed at least partially within housing 632. Presentation device 628 may include, for example, a liquid crystal display (LCD), a light-emitting diode (LED) display, a light-emitting diode (LED), a camera flash, an organic LED (OLED) display, and/or an "electronic ink" display. In some implementations, multiple presentation devices 628 may be included to present data to user 610 visually and/or audibly. In the exemplary implementation, presentation device 628 includes an audio output for use in voice communication.

Computing device 608 further includes input device 630 configured to receive selections, requests, commands, information, data, and/or any other type of inputs from user 610, according to one or more of the methods and/or processes described herein. Input devices 630 may include, for example, buttons, a keyboard, a microphone, a vibe, a pointing device, a stylus, a touch sensitive panel (e.g., a touch pad or a touch screen), a gyroscope, an accelerometer, a digital compass, a position detector, a camera, and/or an audio input interface. Alternatively, a single component, such as a touch screen, functions as both presentation device 628 and input device 630.

Computing device 608 includes a memory 634 and a processor 636 coupled to memory 634 for executing programmed instructions. Processor 636 may include one or more processing units (e.g., in a multi-core configuration) and/or include a cryptographic accelerator (not shown). Computing device 608 is programmable to perform one or more operations described herein by programming memory 634 and/or processor 636. For example, processor 636 may be programmed by encoding an operation as executable instructions and providing the executable instructions in memory 634.

Processor 636 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 636, cause processor 636 to perform at least a portion of the functions described herein. The above examples are exemplary only, and thus are not intended to limit in any way the definition and/or meaning of the term processor.

Memory 634 is one or more devices that enable information such as executable instructions and/or other data to be stored and retrieved. Memory 634 may include one or more computer-readable media, such as, without limitation, dynamic random access memory (DRAM), synchronous dynamic random access memory (SDRAM), static random access memory (SRAM), a solid state disk, and/or a hard disk. Memory 634 may be configured to store, without limitation, executable instructions, operating systems, applications, resources, installation scripts and/or any other type of data suitable for use with the methods and systems described herein.

Instructions for operating systems and applications are located in a functional form on non-transitory memory 634 for execution by processor 636 to perform one or more of the processes described herein. These instructions in the different implementations may be embodied on different physical or tangible computer-readable media, such as memory 634 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 608 to permit access and/or execution by processor 636. In an alternative implementation, the computer-readable media is not removable.

Figure 8:
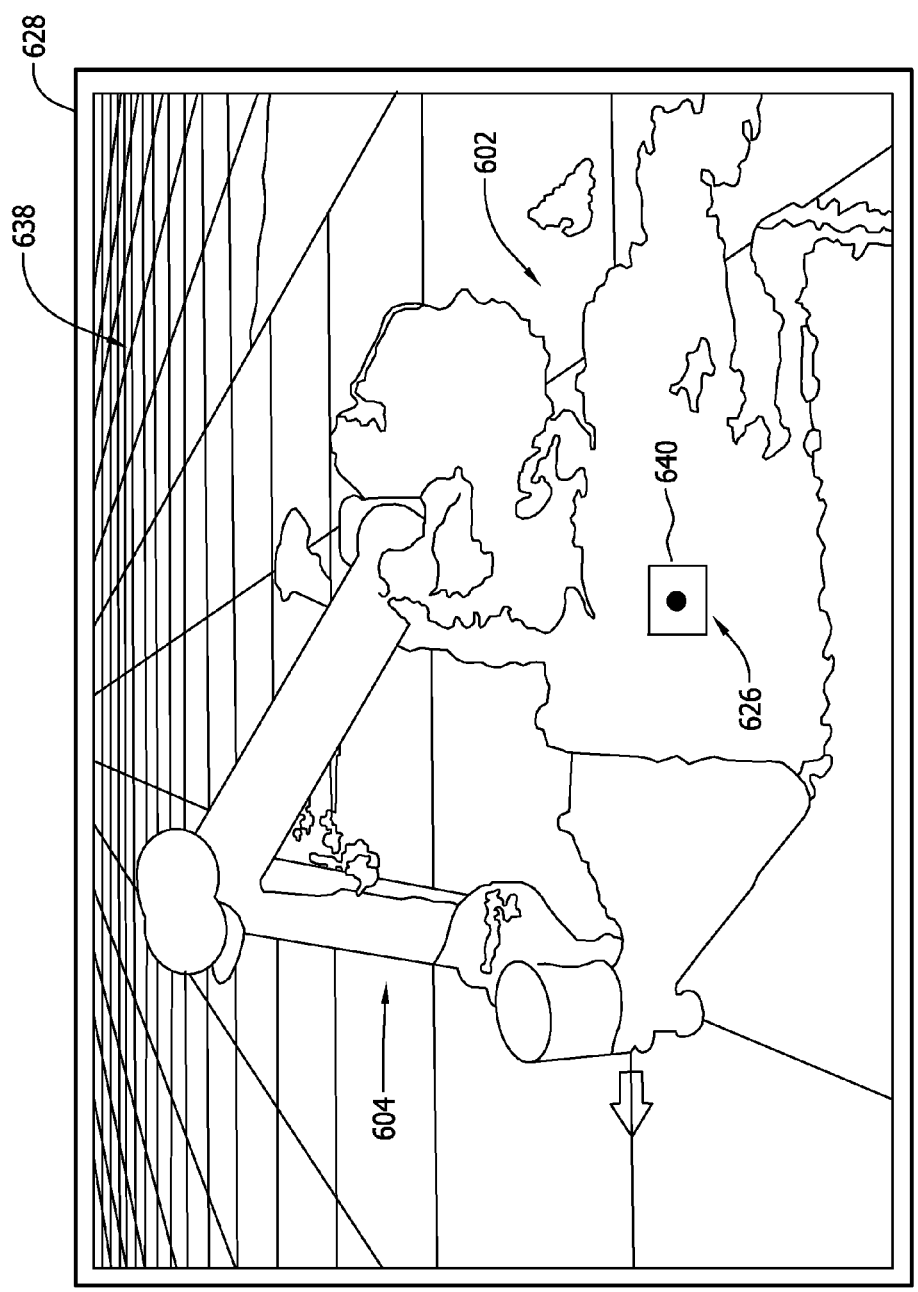
FIG. 8 is an illustration of an exemplary first user interface that may be displayed on the presentation device shown in FIG. 7.
Figure 9:
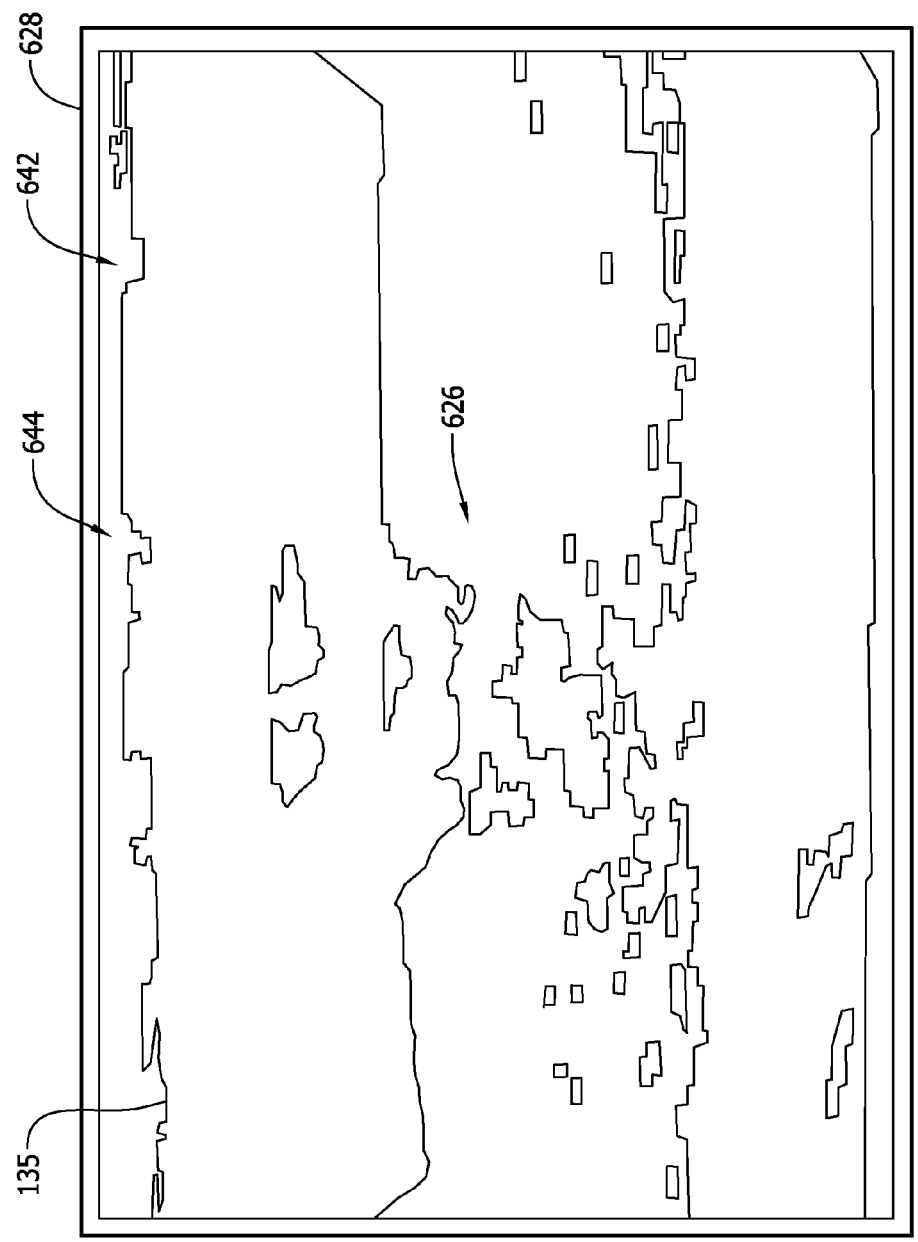
FIG. 9 is an illustration of an exemplary second user interface that may be displayed on the presentation device shown in FIG. 8.
Figure 10:
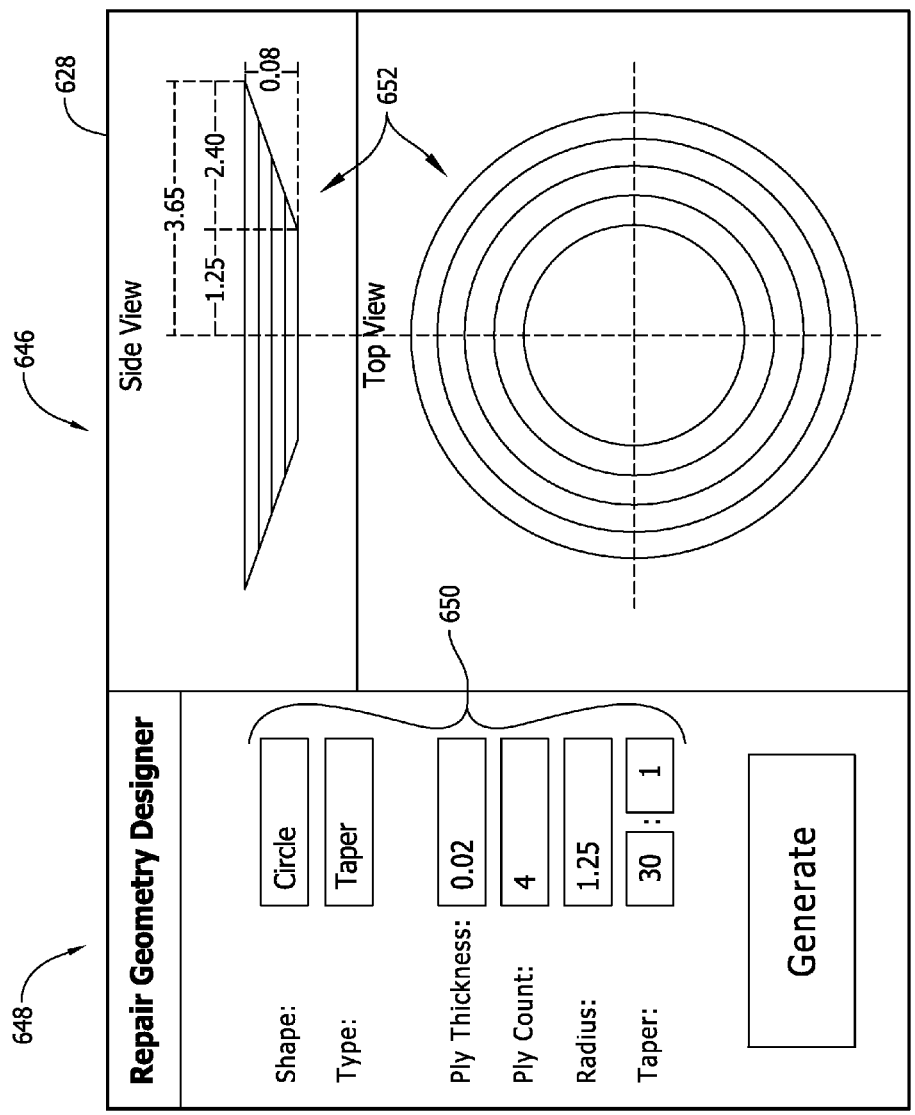
FIG. 10 is an illustration of an exemplary third user interface that may be displayed on the presentation device shown in FIG. 8.

FIGS. 8-10 are illustrations of exemplary user interfaces that may be displayed on presentation device 628. In operation, and as will be described in more detail below, computing device 608 (shown in FIG. 7) directs robotic device 604 to inspect structure 602 with inspection tool 622 (each shown in FIG. 6) to identify structural defect 626, generates a tool path for repairing structural defect 626, and transmits the tool path to robotic device 604. At least some of the aforementioned steps are performed only after data has been provided to computing device 608 from robotic device 604 via bidirectional communication link 614, or after inputs have been provided to computing device 608 from user 610 and work instructions for robotic device 604 have been generated and transmitted to robotic device 604 via bidirectional communication link 614.

For example, referring to FIG. 8, a first user interface 638 includes a virtual image of robotic device 604 and structure 602 at first location 606 (shown in FIG. 5). The virtual image is generated at least partially from feedback obtained from a camera (not shown) that tracks the movements of robotic device 604. In one implementation, when potential damage is detected on fuselage 120, for example, robotic device 604 is coupled to aircraft 100 and computing device 608 directs robotic device 604 to conduct a first scan of structure 602 with inspection tool 622. The first scan is conducted to facilitate further identifying and confirming the existence structural defect 626. Data obtained during the first scan of structure 602 is received by computing device 608, and displayed on presentation device 628 as the virtual image. The virtual image is formed based at least partially on data obtained during the first scan of structure 602. User 610 can then interface with first user interface 638 to select an area of interest 640 on the virtual image. The selection corresponding to area of interest 640 is identified by computing device 608, and computing device 608 directs robotic device 604 to conduct a second scan of structure 602 at area of interest 640 with inspection tool 622. More specifically, computing device 608 generates a tool path for conducting the second scan, based on the selected area of interest 640, and the tool path is transmitted to robotic device 604.

In some implementations, computing device 608 conducts the second scan based at least partially on one or more inspection parameter values provided to computing device 608 from user 610. Exemplary inspection parameters include, but are not limited to, tool speed of end effector assembly 618 and desired image resolution. As such, user 610 can use his unique abilities to design an inspection procedure for robotic device 604 to conduct the second scan.

Referring to FIG. 9, a second user interface 642 includes a three-dimensional point cloud 644 of structural defect 626 generated by computing device 608 based on data received from robotic device 604 during the first and second scans of structure 602. In the exemplary implementation, the second scan is conducted using a non-destructive inspection tool to facilitate obtaining sub-surface geometry data of structural defect 626. As such, three-dimensional point cloud 644 is generated based on surface geometry data obtained during the first scan and sub-surface geometry data obtained during the second scan. Three-dimensional point cloud 644 is displayed on presentation device 628 such that user 610 can evaluate and determine the extent of damage to structure 602 caused by structural defect 626. For example, typical repair procedures generally include removing structural defect 626 from structure 602, which requires excess material to be removed from structure 602 around structural defect 626 both at and below surface 135. As such, generating three-dimensional point cloud 644 enables user 610 to accurately size structural defect 626 to facilitate designing a machining procedure for structure 602.

Referring to FIG. 10, a third user interface 646 includes an example program 648, which enables user 610 to design the machining procedure for structure 602 based on his unique abilities. As described above, multiple users can leverage their collective unique abilities to facilitate repairing structure 602, such that the user that designs the machining procedure for structure 602 is different than the user that designs the inspection procedure, for example. Program 648 includes a plurality of user input fields 650 for user 610 to provide a value for at least one machining parameter for use in designing the machining procedure based on the characteristics of structural defect 626 determined from three-dimensional point cloud 644. Exemplary machining parameters include, but are not limited to, patch area, patch shape, scarf type, scarf radius, scarf angle, step depth, number of steps, step width, and tool speed of end effector assembly 618. Computing device 608 then generates a tool path 652 based at least partially on the machining parameter values input into program 648. Tool path 652 facilitates directing robotic device 604 to remove structural defect 626 from structure 602 using cutting tool 624 to form a recess (not shown) in structure 602. A repair patch can then be positioned within the recess and cured using known procedures.

In some implementations, user 610 also selects a location on structure 602 for robotic device 604 to execute tool path 652. For example, user 610 can access first user interface 638 (shown in FIG. 8) and select the location for executing tool path 652 on the virtual image using input device 630. The location for executing tool path 652 generally corresponds to the location of structural defect 626. Tool path 652 is then transmitted to and executed by robotic device 604.

User 610 may also utilize first user interface 638 to verify a position of robotic device 604 as tool path 652 is executed. The position of robotic device 604 is verified based on real-time feedback provided to computing device 608 as robotic device 604 executes tool path 652, and facilitates ensuring tool path 652 is executed properly.

The implementations described herein relate to systems and methods of performing operations such as manufacture, inspection, maintenance, or repair of a structure. More specifically, the operations are performed using a robotic device that receives work instructions from a computing device. The computing device generates the work instructions based at least partially on inputs received from a user having unique knowledge, skills, and training. For example, the abilities of the user may be leveraged to facilitate generating inspection or repair tool paths for the robotic device, rather than direct motion commands. As such, a semi-autonomous procedure for controlling the robotic device can be generated, and a bidirectional communication link between the robotic device and the computing device facilitates remote operation of the robotic device.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of repairing a structure, said method comprising:
   directing a robotic device to conduct a first scan of the structure using a scanner coupled to the robotic device to identify a structural defect in the structure;
   generating an image of the structure based on data obtained during the first scan of the structure;
   displaying the image of the structure and the identified structural defect on a user interface at a location remote from the robotic device after the inspection of the structure is complete;
   receiving a selection of an area of interest on the image that includes the identified structural defect;
   directing the robotic device to conduct a second scan of the structure at the area of interest with an inspection tool coupled to the robotic device, the inspection tool configured to perform a non-destructive inspection of the structure, to facilitate obtaining sub-surface geometry data of structural defect;
   generating a three-dimensional point cloud of the structure and structural defect, based on surface geometry data obtained during the first scan of the structure and sub-surface geometry data obtained during the second scan of the structure;
   generating a tool path for repairing the structural defect based on a user input received at the user interface; and
   transmitting the tool path to the robotic device from the location remote from the robotic device.

2. The method in accordance with claim 1, wherein directing the robotic device to conduct a second scan comprises conducting a non-destructive inspection of the structure at the area of interest.

3. The method in accordance with claim 1, wherein generating a three-dimensional point cloud of the structural defect enables accurately sizing the structural defect to facilitate a machining procedure, and generating a tool path comprises generating a tool path for directing robotic device to remove the structural defect from structure using a cutting tool, based on user-input of at least one machining parameter.

4. The method in accordance with claim 1, wherein generating a tool path comprises generating the tool path configured to remove the structural defect from the structure and form a recess in the structure when executed by the robotic device.

5. The method in accordance with claim 1, wherein generating a tool path comprises generating the tool path based on at least one of inspection parameters or machining parameters provided by a user.

6. The method in accordance with claim 1 further comprising verifying a position of the robotic device based on real-time feedback as the robotic device executes the tool path.

7. A system for use in repairing a structure, said system comprising:
   a robotic device comprising at least one inspection tool, wherein said robotic device is at a first location; and
   a computing device, comprising a user interface, coupled in communication with said robotic device, wherein said computing device and said user interface are at a second location remote from the first location, said computing device configured to:
   direct the robotic device to conduct a first scan of the structure with the at least one inspection tool to identify a structural defect in the structure;
   generate an image based on data obtained during the first scan of the structure;
   display the image of the structure and the identified structural defect on the user interface after the inspection of the structure is complete;
   receive a selection of an area of interest on the image that includes the identified structural defect;
   direct the robotic device to conduct a second scan of the structure at the area of interest; and
   generate a three-dimensional point cloud of the structure and structural defect based on surface geometry data obtained during the first scan of the structure and sub-surface geometry data obtained during the second scan of the structure;
   generate a tool path for repairing the structural defect based on a user input received at the user interface; and
   transmit the tool path to said robotic device.

8. The system in accordance with claim 7, wherein said at least one inspection tool comprises a surface inspection tool configured to conduct the first scan.

9. The system in accordance with claim 7, wherein said at least one inspection tool comprises a non-destructive inspection tool configured to conduct the second scan.

10. The system in accordance with claim 7, wherein said computing device is further configured to generate the tool path based at least partially on at least one of inspection parameters or machining parameters provided by a user.

11. The system in accordance with claim 7, wherein said robotic device further comprises a cutting tool configured to remove material from the structure as said robotic device executes the tool path.

12. A computer-readable storage media having computer-executable instructions embodied thereon, wherein, when executed by at least one processor, the computer-executable instructions cause the processor to:
   direct a robotic device to conduct a first scan of a structure with at least one inspection tool to identify a structural defect in the structure;
   generate an image based on data obtained during the first scan of the structure;
   display the image on a user interface at a location remote from the robotic device after the inspection of the structure is complete;
   receive a selection of an area of interest on the image; and
   direct the robotic device to conduct a second scan of the structure at the area of interest;

generate a three-dimensional point cloud of the structure and structural defect based on surface geometry data obtained during the first scan of the structure and sub-surface geometry data obtained during the second scan of the structure;

generate a tool path for repairing the structural defect based on a user input received at the user interface; and transmit the tool path to the robotic device from the location remote from the robotic device.

13. One or more computer-readable storage media in accordance with claim 12, wherein the computer-executable instructions further cause the processor to generate the tool path configured to remove the structural defect from the structure and form a recess in the structure when executed by the robotic device.

14. One or more computer-readable storage media in accordance with claim 12, wherein the computer-executable instructions further cause the processor to generate the tool path based on at least one of inspection parameters or machining parameters provided by a user.

* * * * *